United States Patent
Castro (10) Patent No.: US 10,556,719 B1
(45) Date of Patent: Feb. 11, 2020

(54) PALLET STABILIZER

(71) Applicant: INTERNATIONAL PAPER COMPANY, Memphis, TN (US)

(72) Inventor: Julio Cesar Mendoza Castro, Sinaloa (MX)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

(21) Appl. No.: 16/382,433

(22) Filed: Apr. 12, 2019

(51) Int. Cl.
*B65D 19/20* (2006.01)
*B65D 19/00* (2006.01)
*B65D 71/00* (2006.01)

(52) U.S. Cl.
CPC ......... *B65D 19/20* (2013.01); *B65D 19/0026* (2013.01); *B65D 71/0096* (2013.01); *B65D 2519/00019* (2013.01); *B65D 2519/00268* (2013.01); *B65D 2519/00273* (2013.01)

(58) Field of Classification Search
CPC ............... B65D 19/20; B65D 71/0096; B65D 2519/00019
USPC ....................................... 108/57.18
See application file for complete search history.

(56) References Cited

U.S. PATENT DOCUMENTS

| | | | | |
|---|---|---|---|---|
| 5,176,090 | A | * | 1/1993 | Roberts .............. B65D 19/0026 108/51.3 |
| 5,660,119 | A | * | 8/1997 | Perkins .............. B65D 19/0012 108/51.3 |
| 5,784,971 | A | * | 7/1998 | Chang ................ B65D 19/0059 108/51.3 |
| 2003/0094124 | A1 | * | 5/2003 | Wishart ................ B65D 19/38 108/51.11 |
| 2006/0076255 | A1 | * | 4/2006 | Bragadeste ............ B65D 19/20 206/386 |
| 2009/0308289 | A1 | * | 12/2009 | Ferguson ............. B31D 5/0086 108/51.3 |
| 2018/0141703 | A1 | * | 5/2018 | Herbeck ............ B65D 19/0016 |
| 2019/0106241 | A1 | * | 4/2019 | Yamazaki ............. B65D 71/72 |

* cited by examiner

*Primary Examiner* — Daniel J Rohrhoff
(74) *Attorney, Agent, or Firm* — Michael D. Folkerts; Thomas W. Ryan (57) ABSTRACT

A pallet stabilizer formed from a paperboard blank. The pallet stabilizer includes a generally planar central panel having opposing first and second outer longitudinal sides, and opposing first and second lateral sides. A hollow beam structure including at least one beam body is defined by a body flap formed integral with the central panel and comprising a plurality of flap panels connected in series at respective panel fold lines. Two of the flap panels define longitudinally extending opposing beam sides extending transverse to a plane defined by the central panel. One of the flap panels is located distal from the central panel and is hingedly connected to each of the two flap panels defining the beam sides at respective panel fold lines. Opposing longitudinal beam edges are spaced longitudinally inward from the opposing outer longitudinal sides of the central panel.

20 Claims, 7 Drawing Sheets

PALLET STABILIZER

FIELD OF THE INVENTION

The present disclosure relates to a pallet stabilizer structure and, more particularly, to a pallet stabilizer structure that can be formed from a paperboard blank.

BACKGROUND OF THE INVENTION

Palleted goods, or pallets, are frequently shipped via truckload shipping, e.g., with the pallets loaded in trailers, where numerous pallets can be placed in front-to-back and side-to-side relationship to one another. Due to weight restrictions, setting maximum weights for the freight on a trailer, the pallets may be distributed throughout the trailer to provide a distributed weight along the length and between the sides of the trailer. The distribution of pallets often results in a spacing between adjacent pallets and between pallets and the sides of the trailer. For example, the pallets may be arranged in rows extending in the width direction of a trailer, where the rows can be alternately positioned to the left and right in a zig-zag pattern extending from front to back in the trailer, and alternately leaving spaces between each pallet row and a side of the trailer. Additionally, the alternating rows can include rows that position pallets adjacent to both sides of the trailer, leaving a central space between the pallets on either side. During transportation, the spaces around the pallets can permit the pallets to shift or lean with resulting distortion of, for example, stacked containers forming the pallet. Hence, there is a need for a stabilizing structure that can fill the spaces between pallets and/or between pallets and the sides of a trailer to prevent shifting of the pallets during transport.

SUMMARY OF THE INVENTION

In accordance with an aspect of the invention, a pallet stabilizer formed from a paperboard blank is disclosed. The pallet stabilizer comprises a generally planar central panel having opposing first and second outer longitudinal sides, and opposing first and second lateral sides. A hollow beam structure including at least one beam body is defined by a body flap formed integral with the central panel and comprising a plurality of flap panels connected in series at respective panel fold lines. Two of the flap panels define longitudinally extending opposing beam sides extending transverse to a plane defined by the central panel. One of the flap panels is located distal from the central panel and is hingedly connected to each of the two flap panels defining the beam sides at respective panel fold lines. Opposing longitudinal beam edges are spaced longitudinally inward from the opposing outer longitudinal sides of the central panel.

Each of the opposing beam sides may be spaced laterally inward from a respective one of the first and second lateral sides of the central panel.

The plurality of flap panels forming the at least one beam body may comprise first, second, third, and fourth flap panels connected in series at first, second, and third panel fold lines, respectively, and the first flap panel may be hingedly joined to the central panel along a lateral flap fold line generally transverse to the first and second outer longitudinal sides, and the fourth flap panel can define an outer edge of the body flap.

The fourth flap panel may be positioned in parallel overlapping relation on the central panel with the outer edge located adjacent to the first flap panel at the lateral flap fold line.

The at least one beam body may include a first locking structure for cooperating with a second locking structure on the central panel to hold the at least one beam body in engagement with the central panel.

One of the first and second locking structures may comprise a body tab structure located at a longitudinal edge of the at least one beam body and the other of the first and second locking structures may comprise a tongue structure hingedly connected in the central panel and including a lock tab structure for positioning in overlapping engagement over the body tab structure to maintain the tongue structure in overlapping relation over the edge of the at least one beam body.

The body flap may include a pair of longitudinally spaced first locking structures located at the first and second longitudinal edges of the at least one beam body, and the central panel may include a pair of longitudinally spaced second locking structures located for engagement with respective ones of the first locking structures.

The pallet stabilizer may further include one or more longitudinal score lines extending laterally across the flap panels and defining a fold or tear location configured for decreasing a longitudinal dimension of the at least one beam body, wherein a first locking structure may be defined longitudinally aligned with each longitudinal score line for cooperating with a corresponding longitudinally aligned second locking structure on the central panel to hold the at least one beam body in engagement with the central panel.

The at least one body flap may comprise a first body flap forming a first beam body, the hollow beam structure may further include a second body flap formed integral with the central panel and forming a second beam body laterally spaced from the first beam body which may comprise a plurality of second beam flap panels connected in series at respective panel fold lines, two of the plurality of second beam flap panels defining longitudinally extending opposing second beam sides extending transverse to a plane defined by the central panel, and one of the second beam flap panels being located distal from the central panel and hingedly connected to each of the two second beam flap panels defining the second beam sides at respective panel fold lines.

In accordance with another aspect of the invention, a pallet stabilizer formed from a paperboard blank is disclosed. The pallet stabilizer comprises a generally planar central panel having opposing first and second outer longitudinal sides, and opposing first and second lateral sides. A hollow beam structure including first and second beam bodies is defined by respective first and second body flaps formed integral with the central panel. Each of the beam bodies comprises a plurality of flap panels connected in series at respective panel fold lines. Two of the flap panels define longitudinally extending opposing beam sides extending transverse to a plane defined by the central panel. One of the flap panels is located distal from the central panel and hingedly connected to each of the two flap panels defining the beam sides at respective panel fold lines. Opposing longitudinal beam edges are spaced longitudinally inward from the opposing outer longitudinal sides of the central panel.

The first and second beam bodies may be spaced laterally inward from a respective one of the first and second lateral sides of the central panel.

The plurality of flap panels forming each respective beam body may comprise first, second, third, and fourth flap panels connected in series at first, second, and third panel fold lines, respectively, and the first flap panel may be hingedly joined to the central panel along a lateral flap fold line generally transverse to the first and second outer longitudinal sides.

The fourth flap panel of each beam body may be positioned in parallel overlapping relation on the central panel.

In accordance with a further aspect of the invention, a paperboard blank for use in forming a pallet stabilizer is disclosed comprising a central panel having opposing first and second outer longitudinal sides, and opposing first and second lateral sides. At least one body flap is hingedly joined to the central panel along a lateral flap fold line generally transverse to the first and second outer longitudinal sides, the at least one body flap having first and second inner longitudinal edges spaced inward from the first and second outer longitudinal sides and extending laterally outward from the central panel. An outer edge is defined at a laterally opposing end of the at least one body flap from the flap fold line, and first, second, third, and fourth flap panels are connected in series at first, second, and third panel fold lines, respectively. The flap panels are foldable relative to the each other and relative to the central panel to position the fourth flap panel in parallel overlapping relation on the central panel when the paperboard blank is formed into a pallet stabilizer.

The fourth flap panel may include a first locking structure for cooperating with a second locking structure on the central panel to hold the fourth flap panel in engagement with the central panel when the paperboard blank is formed into a pallet stabilizer.

One of the first and second locking structures may comprise a body tab structure located at a longitudinal edge of the at least one body flap and the other of the first and second locking structures may comprise a tongue structure hingedly connected in the central panel and including a lock tab structure for positioning in overlapping engagement over the body tab structure when the paperboard blank is formed into a pallet stabilizer.

The fourth flap panel may include a pair of longitudinally spaced first locking structures located at the first and second inner longitudinal edges, and the central panel may include a pair of longitudinally spaced second locking structures located for engagement with respective ones of the first locking structures.

The flap fold line may be located laterally inward on the central panel between the first and second lateral sides of the central panel.

The paperboard blank may include one or more longitudinal score lines extending laterally across the at least one body flap from the flap fold line to the outer edge and defining a fold or tear location configured for decreasing a longitudinal dimension of the flap.

The at least one body flap may comprise a first body flap, and a second body flap may be provided hingedly joined to the central panel along a lateral second flap fold line generally transverse to the first and second outer longitudinal sides. The second body flap may include first and second inner longitudinal edges spaced inward from the first and second outer longitudinal sides and extending laterally outward from the central panel opposite from the first body flap, and an outer edge at a laterally opposing end of the second body flap from the second flap fold line, and first, second, third, and fourth flap panels connected in series at first, second, and third panel fold lines, respectively.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present description is directed to a pallet stabilizer that can be provided as a stabilizing structure between pallet stacks, configured as stacks of goods on pallets and generally referred to herein as "pallets," and can additionally be provided as a stabilizing structure between a pallet, i.e., a pallet stack, and a shipping container wall, e.g., a trailer wall, or similar stable structure. Further, while the goods depicted herein for shipment on the pallet comprise boxes or cartons, it may be understood that the present description is not limited to a pallet of any particular type of goods. As may be understood from the following description, the pallet stabilizer described herein can be used to stabilize one or more pallets, wherein the pallet stabilizer could be provided to a user or customer as a planar unitary blank and quickly configured into an erected configuration for use in stabilizing the pallet(s).

Figure 1:
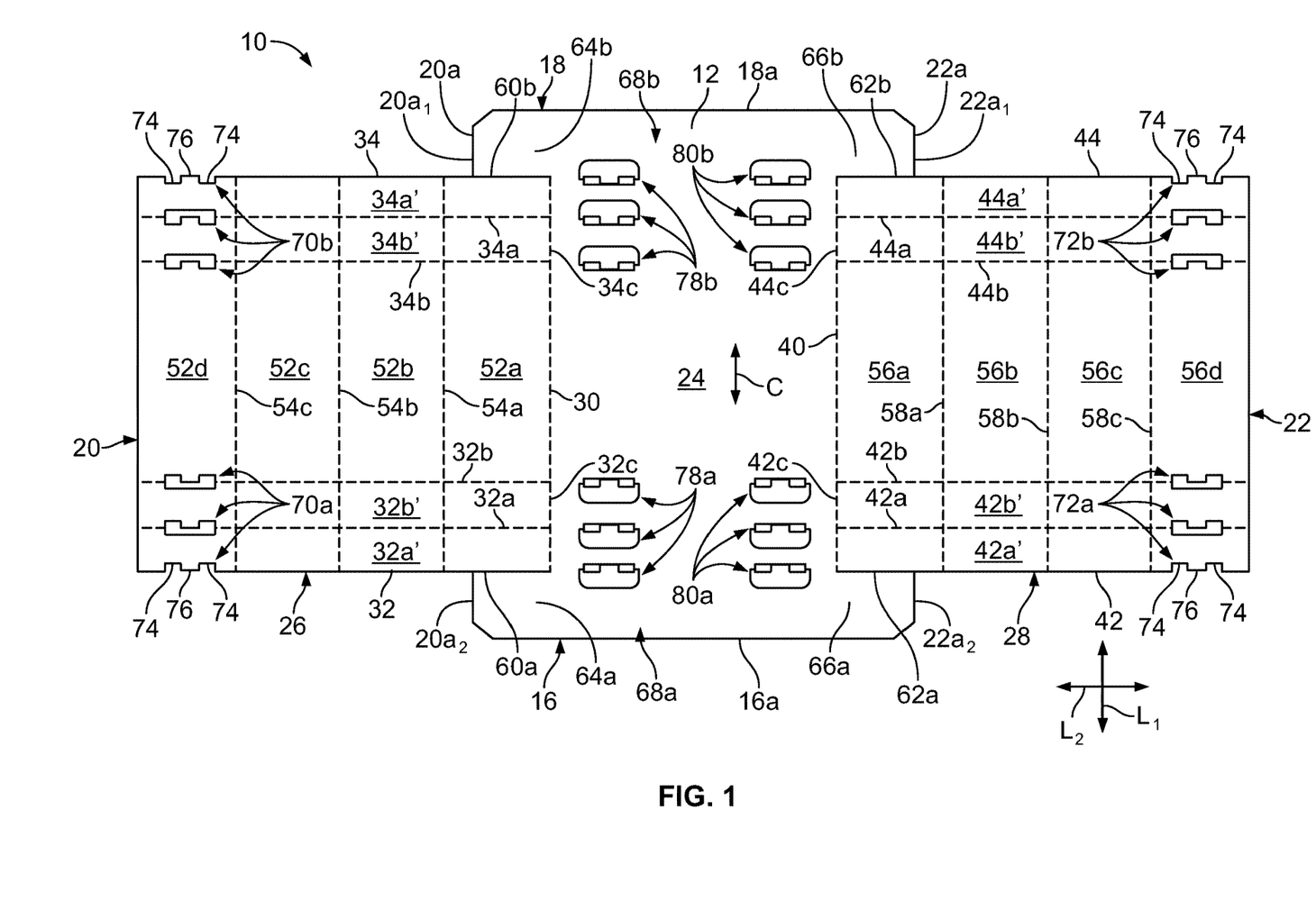
FIG. 1 is a plan view of a blank for forming a pallet stabilizer.
Figure 7:
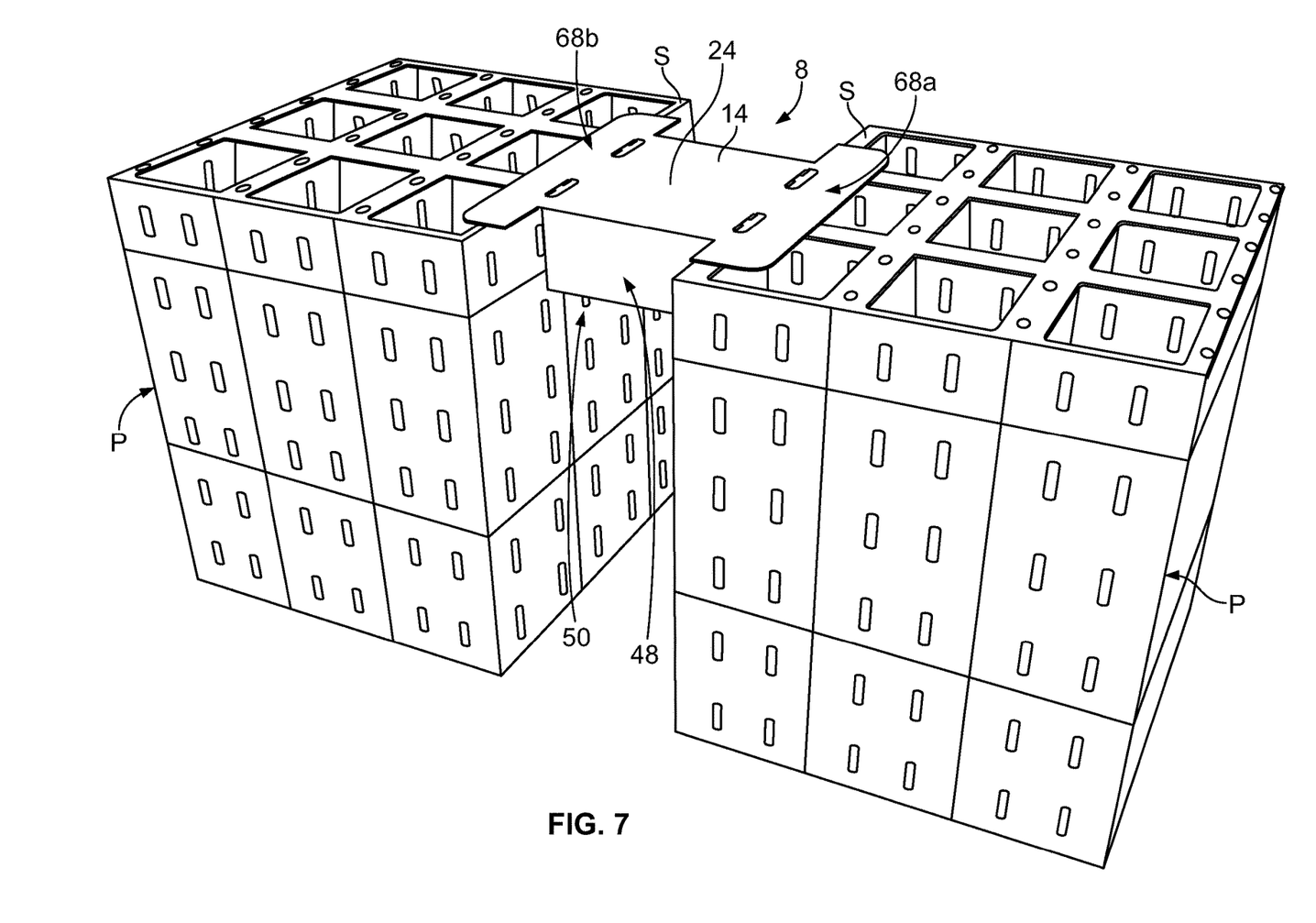
FIG. 7 is a perspective view illustrating the pallet stabilizer of FIG. 3 in position between two pallets.

Referring to FIG. 1, a die cut blank 10 is shown for illustrating one or more aspects of the pallet stabilizer described herein. In a use of the blank 10 to form a pallet stabilizer 8, see FIGS. 3 and 7, the blank 10 may be formed of a corrugated cardboard material such as, e.g., single-wall corrugated material, and may be die cut to the shape shown herein, although other materials and variations of the illustrated shape may be provided within the scope of the pallet stabilizer described and claimed herein. The blank 10 illustrated in FIG. 1 is a planar piece of material in which an inner or lower side 12 is shown facing out of the page and an outer or upper side 14, see FIG. 7, is facing an opposite direction from the inner side 12.

As seen in FIG. 1, the blank 10 extends in a longitudinal direction $L_1$ between first and second longitudinal edges, generally designated 16 and 18, respectively, and further extends in a lateral direction $L_2$ between first and second lateral edges, generally designated 20 and 22, respectively. The blank 10 comprises a generally planar central panel 24 including a first outer longitudinal side 16a coinciding with the first longitudinal edge 16 of the blank 10, an opposing second outer longitudinal side 18a coinciding with the second longitudinal edge 18 of the blank 10, and opposing first and second lateral sides 20a, 22a. It may be noted that the elongated direction C of the flutes for the corrugated material of the blank 10 are oriented to extend parallel to the longitudinal direction $L_1$.

The blank 10 further comprises a first and second body flaps 26, 28. The first body flap 26 is hingedly joined to the central panel 24 along a lateral flap fold line 30 extending generally transverse to the first and second outer longitudinal sides 16a, 18a. The first body flap 26 includes first and second inner longitudinal edges 32, 34 spaced inward from the respective first and second outer longitudinal sides 16a, 18a, wherein the first and second inner longitudinal edges 32, 34 extend laterally outward from the central panel 24 between the first flap fold line 30 and an outer edge of the first body flap 26 defined at the first lateral edge 20. Further, the first and second inner longitudinal edges 32, 34 extend laterally outward from a pair of first lateral side portions $20a_1$, $20a_2$ defining the first lateral side 20a of the central panel 24 on opposing longitudinal sides of the first body flap 26.

The second body flap 28 is hingedly joined to the central panel 24 along a lateral flap fold line 40 extending generally transverse to the first and second outer longitudinal sides 16a, 18a. The second body flap 28 includes first and second inner longitudinal edges 42, 44 spaced inward from the respective first and second outer longitudinal sides 16a, 18a, wherein the first and second inner longitudinal edges 42, 44 extend laterally outward from the central panel 24 between the second flap fold line 40 and an outer edge of the second body flap 28 defined at the second lateral edge 22. Further, the first and second inner longitudinal edges 42, 44 extend laterally outward from a pair of second lateral side portions $22a_1$, $22a_2$ located on opposing longitudinal sides of the second body flap 28 and defining the second lateral side 22a of the central panel 24.

Figure 3:
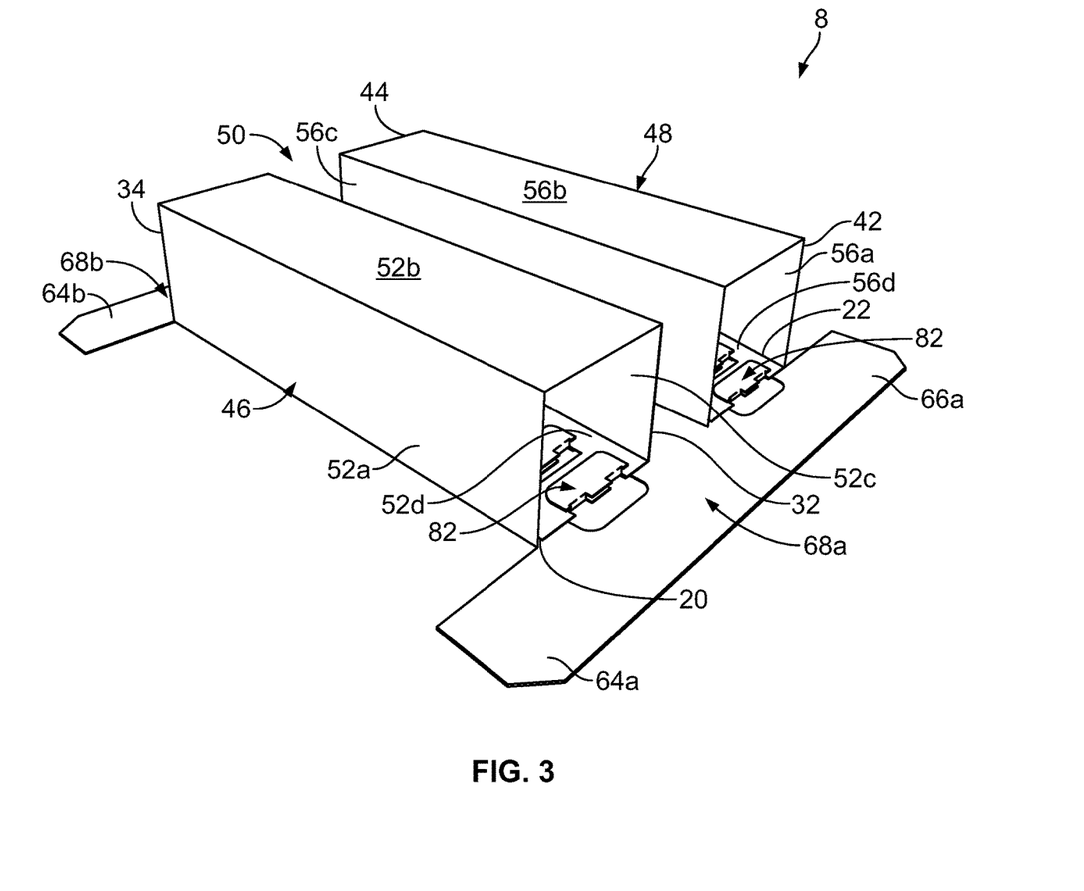
FIG. 3 is a perspective view of a pallet stabilizer formed using the blank of FIG. 1.

The first and second body flaps 26, 28 are configured as foldable members to form respective first and second hollow beam bodies 46, 48 defining a hollow beam structure 50, see FIG. 3. Referring to FIG. 1, the first body flap 26 comprises a first flap panel 52a, a second flap panel 52b, a third flap panel 52c, and a fourth flap panel 52d connected in series at a first panel fold line 54a, a second panel fold line 54b, and a third panel fold line 54c, respectively. The first, second, and third panel fold lines 54a, 54b, 54c may comprise crease rule fold lines.

The first flap fold line 30 is defined at a connection between the first flap panel 52a and the central panel 24, wherein the first flap fold line 30 is located laterally spaced inward from the first lateral side portions $20a_1$, $20a_2$. At least a portion of the flap fold line 30 can comprise a crease rule fold line. A pair of separation lines 60a, 60b extend laterally along the inner longitudinal edges 32, 34 from the first flap fold line 30 to the first lateral side portions $20a_1$, $20a_2$, separating the first body flap 26 from the central panel 24 and permitting pivotal movement of the first body flap 26 within the central panel 24.

The second body flap 28 comprises a first flap panel 56a, a second flap panel 56b, a third flap panel 56c, and a fourth flap panel 56d connected in series at a first panel fold line 58a, a second panel fold line 58b, and a third panel fold line 58c, respectively. The first, second, and third panel fold lines 58a, 58b, 58c may comprise crease rule fold lines. The second flap fold line 40 is defined at a connection between the first flap panel 56a and the central panel 24, wherein the second flap fold line 40 is located laterally spaced inward from the second lateral side portions $22a_1$, $22a_2$. At least a portion of the flap fold line 40 can comprise a crease rule fold line. A pair of separation lines 62a, 62b extend laterally along the inner longitudinal edges 42, 44 from the second flap fold line 40 to the second lateral side portions $22a_1$, $22a_2$, separating the second body flap 28 from the central panel 24 and permitting pivotal movement of the second body flap 28 within the central panel 24.

The term "separation line" as used herein may be defined, for example, by a perforated line, or a cut line that extends completely through the material, and may comprise a partial cut through at least one layer of the corrugated material or a cut line interrupted by short sections of bridging (uncut) material.

Figure 2:
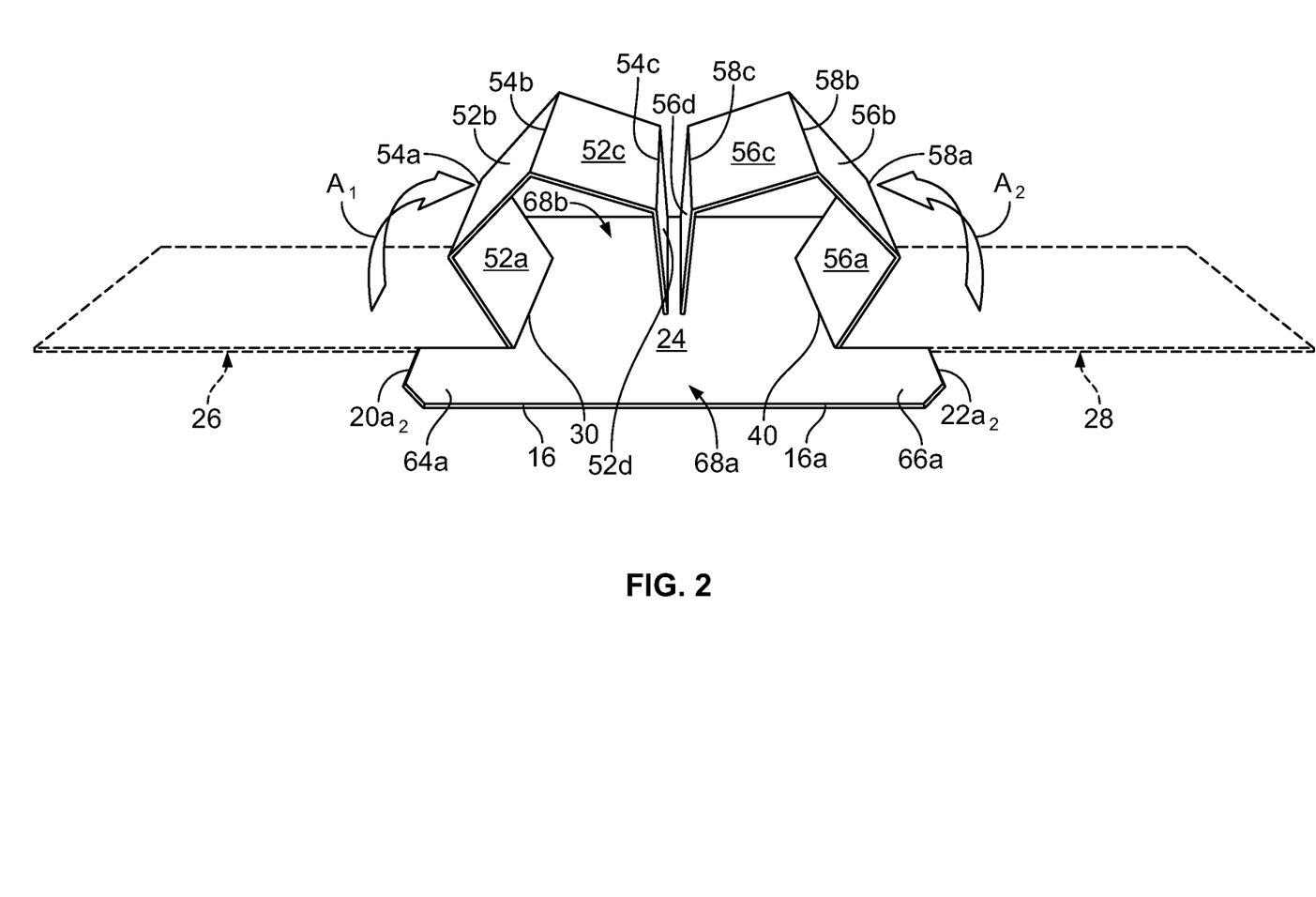
FIG. 2 is a perspective view illustrating a partially erected pallet stabilizer using the blank of FIG. 1.

Referring to FIG. 2, the blank 10 can be positioned into an erected configuration forming the first beam body 46 by pivoting the first flap panel 52a of the first body flap 26 upward about the first flap fold line 30 to position the first body flap 26 inwardly toward the lateral center of the central panel 24, as depicted by arrow $A_1$. The second, third, and fourth flap panels 52b, 52c, 52d are pivoted about the respective panel fold lines 54a, 54b, 54c to position the fourth flap panel 52d in parallel overlapping relation on the central panel 24 with the upper side 14 thereof facing the central panel 24, wherein the outer edge defined by the first lateral edge 20 can be located adjacent to the first flap panel 52a at the lateral flap fold line 30, see FIG. 3. It should be noted that the fourth flap panel 52d is joined or affixed to the central panel 24, as is described in greater detail below In the erected configuration, the first and third flap panels 52a, 52c define longitudinally extending opposing beam sides of the first beam body 46 that can extend outward from the central panel 24 transverse to a plane defined by the central panel 24. The second flap panel 52b defines a connecting structure between edges of the beam sides, i.e., at the first and second panel fold lines 54a, 54b, distal from the central panel 24. In particular, in the illustrated erected configuration, the first and third flap panels 52a, 52c can extend generally perpendicular to the central panel 24, and the second flap panel 52b can extend generally perpendicular to the first and third flap panels 52a, 52c in spaced relation to the central panel 24.

Similar to the above description for erecting the first beam body 46, the blank 10 can be positioned into an erected configuration forming the second beam body 48 by pivoting the first flap panel 56a of the second body flap 28 upward about the second flap fold line 40 to position the second body flap 28 inwardly toward the lateral center of the central panel 24, as depicted by arrow $A_2$ in FIG. 2. The second, third, and fourth flap panels 56b, 56c, 56d are pivoted about the respective panel fold lines 58a, 58b, 58c to position the fourth flap panel 56d in parallel overlapping relation on the central panel 24 with the upper side 14 thereof facing the central panel 24, wherein the outer edge defined by the second lateral edge 22 can be located adjacent to the first flap panel 56a at the lateral flap fold line 40, see FIG. 3. It should be noted that the fourth flap panel 56d is joined or affixed to the central panel 24, as is described in greater detail below In the erected configuration, the first and third flap panels 56a, 56c define longitudinally extending opposing beam sides of the second beam body 48 that can extend outward from the central panel 24 transverse to the plane defined by the central panel 24. The second flap panel 56b defines a connecting structure between edges of the beam sides, i.e., at the first and second panel fold lines 58a, 58b, distal from the central panel 24. In particular, in the illustrated erected configuration, the first and third flap panels 56a, 56c can extend generally perpendicular to the central panel 24, and the second flap panel 56b can extend generally perpendicular to the first and third flap panels 56a, 56c in spaced relation to the central panel 24.

Further, the first beam side of the first beam body 46, defined by the first flap panel 52a, can be spaced laterally inward from the first lateral side 20a defined by the first and second lateral side portions $20a_1$, $20a_2$, such that a first pair of lateral extensions 64a, 64b are defined on the central panel 24, see FIGS. 1 and 3. Similarly, the first beam side of the second beam body 48, defined by the first flap panel 56a, can be spaced laterally inward from the second lateral side 22a defined by the first and second lateral side portions $22a_1$, $22a_2$, such that a second pair of lateral extensions 66a, 66b are defined on the central panel 24.

The lateral extensions 64a, 66a comprise laterally opposing ends of a first support member 68a that extends longitudinally outward from first longitudinal ends of the first and second beam bodies 46, 48, corresponding to the respective inner longitudinal edges 32, 42 of the body flaps 26, 28. The lateral extensions 64b, 66b comprise laterally opposing ends of a second support member 68b that extends longitudinally outward from second longitudinal ends of the first and second beam bodies 46, 48, corresponding to the respective inner longitudinal edges 34, 44 of the body flaps 26, 28. Hence, the first and second longitudinal edges 32, 42 and 34, 44, defining the ends of the beam bodies 46, 48, are located longitudinally inward from the respective first and second longitudinal sides 16a, 18a of the central panel 24.

Referring to FIG. 1, the blank 10 can include at least one pair of longitudinally spaced first locking structures 70a, 70b located at the inner longitudinal edges 32, 34 of the first body flap 26. Similarly, the blank 10 includes at least one pair of longitudinally spaced first locking structures 72a, 72b located at the inner longitudinal edges 42, 44 of the second body flap 28. Additionally, in the illustrated embodiment, the first body flap 26 can include a plurality of pairs of the spaced first locking structures 70a, 70b, and the second body flap 28 can include a plurality of the pairs of spaced first locking structures 72a, 72b.

Figure 5:
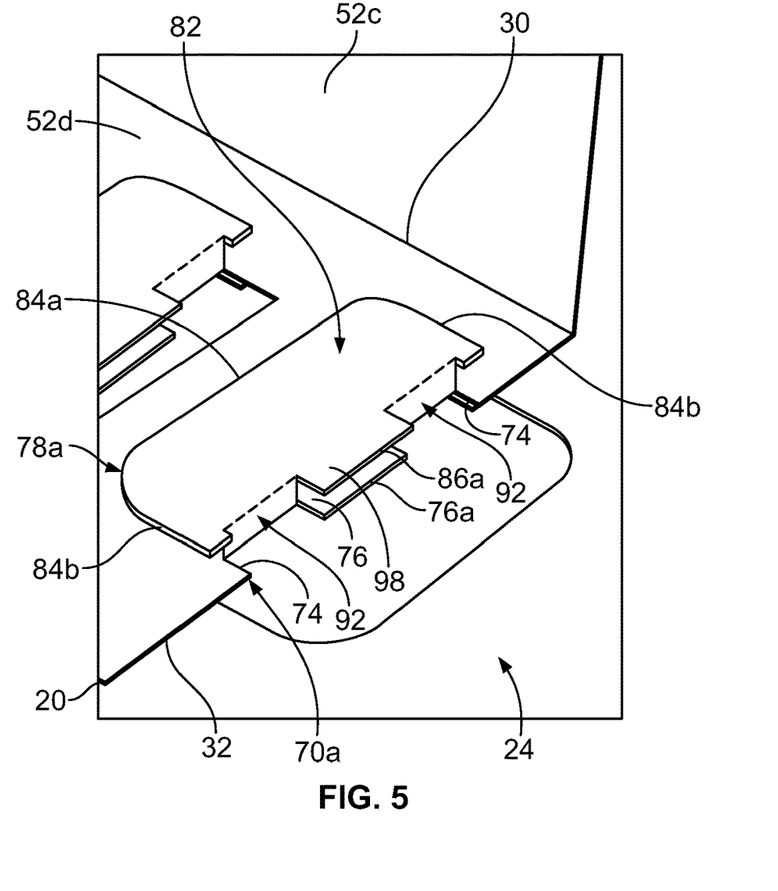
FIG. 5 is an enlarged perspective view of the second locking structure of FIG. 4 engaged with a first locking structure for locking a beam body of the pallet stabilizer in an erected position.

The first locking structures 70a, 70b, 72a, 72b are substantially identical and are defined by cut-out portions of the blank 10 including a pair of rectangular notches 74 located on either side of a body tab structure 76. The body tab structure 76 includes a tab outer end 76a that can be generally longitudinally aligned with a respective inner longitudinal edge 32, 34, 42, 44, see FIG. 5.

Referring to FIG. 1, the blank 10 can include two pairs of second locking structures corresponding to the first locking structures 70a, 70b, 72a, 72b described above. In particular, the central panel 24 can comprise at least one pair of longitudinally spaced second locking structures 78a, 78b located adjacent or near to the first flap fold line 30, and a second pair of longitudinally space second locking structures 80a, 80b located adjacent or near to the second flap fold line 40. Additionally, in the illustrated embodiment, a plurality of pairs of the first and second pairs of spaced second locking structures 78a, 78b and 80a, 80b can be provided longitudinally aligned with corresponding pairs of the respective first locking structures 70a, 70b and 72a, 72b.

Figure 4:
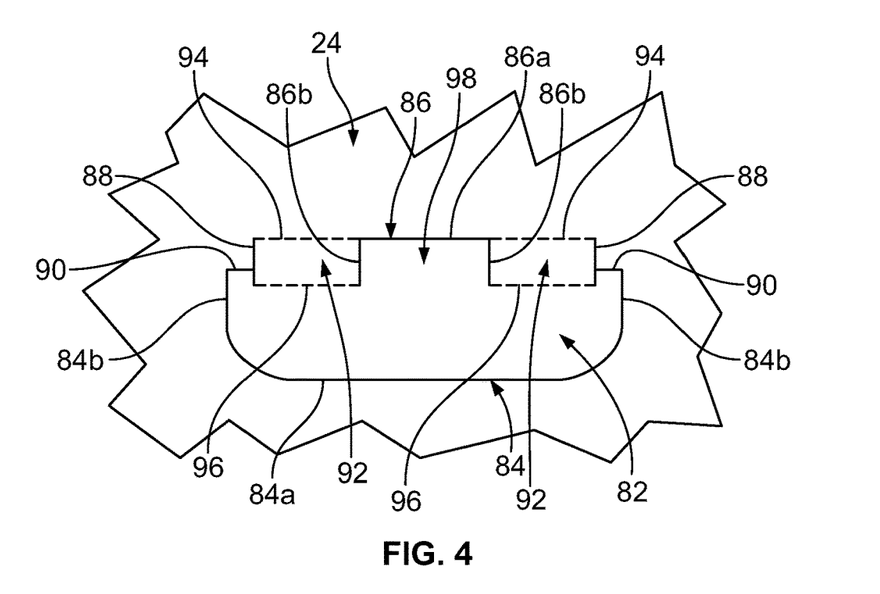
FIG. 4 is an enlarged plan view of a second locking structure for locking a beam body of the pallet stabilizer in an erected position.

Referring to FIG. 4, the second locking structures 78a, 78b, 80a, 80b are substantially identical and comprise a tongue 82 defined by a separation line 84 having a longitudinal front portion 84a and a pair of outer lateral portions 84b extending rearwardly from the front portion 84a. A U-shaped separation line 86 defines a lock tab structure 98 and includes a longitudinal rear portion 86a and a pair of inner lateral portions 86b extending forwardly from the rear portion 86a. Hinge separation lines 88 extend parallel to the inner lateral portions 86b, and connector separation lines 90 extend laterally between the hinge separation line 88 and the outer lateral portions 84b. A pair of hinge portions 92 are defined between pairs of the inner lateral portions 86b and the hinge separation lines 88, wherein the hinge portions 92 are hingedly connected to the central panel 24 at a first hinge score line 94 and are hingedly connected to the tongue 82 at a second hinge score line 96.

When the first and second beam bodies 46, 48 are erected, positioning the fourth flap panels 52d, 56d in overlapping engagement on the central panel 24, the first locking structures 70a, 70b, 72a, 72b are located adjacent to rear portions of respective second locking structures 78a, 78b, 80a, 80b. The tongue 82 can be pivoted upward and over an adjacent portion of a respective fourth flap panel 52d, 56d, wherein the hinge portions 92 can extend generally perpendicular to the central panel 24 through the rectangular notches 74 to retain the fourth flap panels 52d, 56d against movement in the lateral direction. Further, pivoting of the tongue 82 into overlapping relation over the fourth flap panel 52d, 56d positions the lock tab structure 98 over the body tab structure 76 with the longitudinal rear portion 86a of the lock tab structure 98 generally aligned with the tab outer end 76a at a location longitudinally distal from the hinge portions 92. Hence, upward movement of the tongue 82, away from its locking position against the fourth flap panel 52d, 56d, can be resisted by engagement of the lock tab structure 98 against the body tab structure 76.

The erected pallet stabilizer 8 can be placed between two pallets P positioned, for example, in a trailer for shipping, see FIG. 7, thereby filling a space between the pallets P and limiting or preventing shifting of either one of the pallets P toward the other pallet P. In a use position, the pallet stabilizer 8 is oriented with the central panel 24 above the beam bodies 46, 48, and with the beam bodies 46, 48 extending longitudinally between the two pallets P. The support members 68a, 68b can rest on upper surfaces S of the pallets P to vertically support the pallet stabilizer 8 with ends of the beam bodies 46, 48 positioned closely adjacent to a side of a respective pallet P. It may be noted that, since the elongated direction C of the flutes for the corrugated material extends in the longitudinal direction, the corrugated material is oriented to resist crushing in the longitudinal direction of the beam bodies 46, 48.

The orientation of the elongated direction C of the flutes further can facilitate resistance to bending of the central panel 24 in the location where the support members 68a, 68b extend longitudinally from the beam bodies 46, 48. However, it should also be understood that the present construction does not necessarily preclude a user from reconfiguring the pallet stabilizer 8, such as by intentionally bending one of the support members 68a, 68b upward, i.e., perpendicular to the plane of the central panel 24. For example, in a use of the pallet stabilizer 8 between a pallet and a trailer wall, one of the support members 68a, 68b could be bent perpendicular to the trailer wall (not shown) to permit one end of the beam bodies 46, 48 to be positioned against trailer wall, while the other of the support members 68a, 68b can remain parallel to the plane of the central panel 24 for supporting an opposing end of the pallet stabilizer 8 on an upper surface of a pallet.

In order to accommodate different loading configurations for placing the pallets in a trailer, and to accommodate different trailer widths, it may be necessary to provide different beam lengths to the beam bodies 46, 48 of the pallet stabilizer 8. Hence, in accordance with an aspect of the present blank 10, the blank 10 can be configured to provide one or more predetermined lengths for the beam bodies 46, 48, to thereby position the longitudinal ends of the beam bodies 46, 48 closely adjacent to the sides of respective pallets P, or adjacent to a side of a trailer. The predetermined lengths for the beam bodies 46, 48 can be selected, for example, with reference to known, i.e., preestablished/conventional, trailer widths that, in combination with the pallets, can create predetermined spaces that can be filled with the pallet stabilizer 8.

Figure 6:
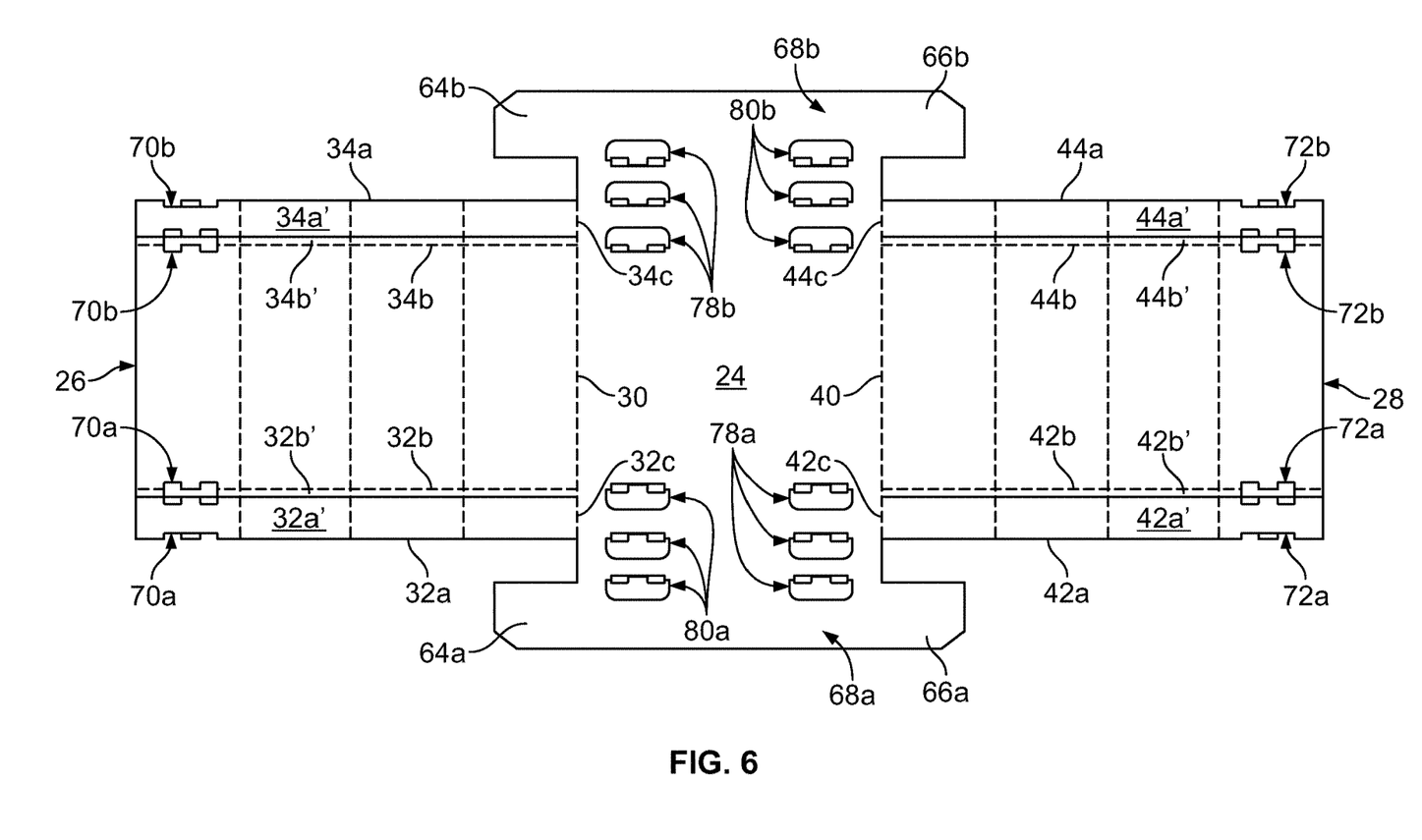
FIG. 6 is a plan view of the blank of FIG. 1 modified to provide a reduced longitudinal dimension for beam bodies of the pallet stabilizer.

Referring to FIGS. 1 and 6, the first body flap 26 can include one or more length score lines 32a, 32b and 34a, 34b extending parallel to the respective longitudinal edges 32, 34 and defining respective length sections 32a', 32b' and 34a', 34b'. The one or more length score lines 32a, 32b and 34a, 34b can be longitudinally aligned with respective first locking structures 70a, 70b. The edges of the first body flap 26 can folded, or alternatively torn off, at the length score lines 32a, 32b and 34a, 34b to shorten the beam length defined by the first body flap 26. For example, as illustrated in FIG. 6, either or both of the length sections 32a' and 34a' can be folded about the respective length score lines 32a, 34a to overlap the adjacent length sections 32b' and 34b' prior to folding the first body flap 26 to form the first beam body 46. It may be understood that folding the length sections 32a' and 34a' can expose respective first locking structures 70a, 70b for engagement with longitudinally aligned ones of the second locking structures 78a, 78b on the central panel 24. Similarly, a shorter length for the first beam body 46 can be provided by folding the first body flap edge sections defined by the pair of length sections 32a', 32b' and the pair of length sections 34a', 34b' about the respective length score lines 32b and 34b, positioning the pairs of length sections 32a', 32b' and 34a', 34b' inwardly in overlapping relationship on the first body flap 26 prior to folding the first body flap 26 to form the first beam body 46. It should be noted that the portions 32c, 34c of the lateral flap fold line 30 adjacent to the ends of the length sections 32a', 32b', 34a', 34b' can be formed with perforations or through cuts sufficient to facilitate separation of the length sections 32a', 32b', 34a', 34b' from the central panel 24, whereas the remainder of the flap fold line 30 may be formed as a crease rule fold line, i.e., a non-separating fold line.

The second body flap 28 may be formed with a construction for forming predetermined shortened lengths for the second beam body 48 similar to the construction described above for the first body flap 26. In particular, the second body flap 28 can include one or more length score lines 42a, 42b and 44a, 44b extending parallel to the respective longitudinal edges 42, 44 and defining respective length sections 42a', 42b' and 44a', 44b'. The edges of the second body flap 28 can folded, or alternatively torn off, at the length score lines 42a, 42b and 44a, 44b to shorten the beam length defined by the second body flap 28, in the same manner as described above for forming an alternative length of the first beam body 46. Further, the portions 42c, 44c of the lateral flap fold line 40 adjacent to the ends of the length sections 42a', 42b', 44a', 44b' can be formed with perforations or through cuts sufficient to facilitate separation of the length sections 42a', 42b', 44a', 44b' from the central panel 24, whereas the remainder of the flap fold line 40 may be formed as a crease rule fold line, i.e., a non-separating fold line.

It may be noted that the length score lines 32a, 32b, 34a, 34b and 42a, 42b, 44a, 44b, of the first and second body flaps 26, 28 can be formed as perforated lines extending fully or partially through the blank 10 for facilitating either folding or tearing, i.e. separating, the respective length sections 32a', 32b', 34a', 34b' and 42a', 42b', 44a', 44b'.

Figure 8:
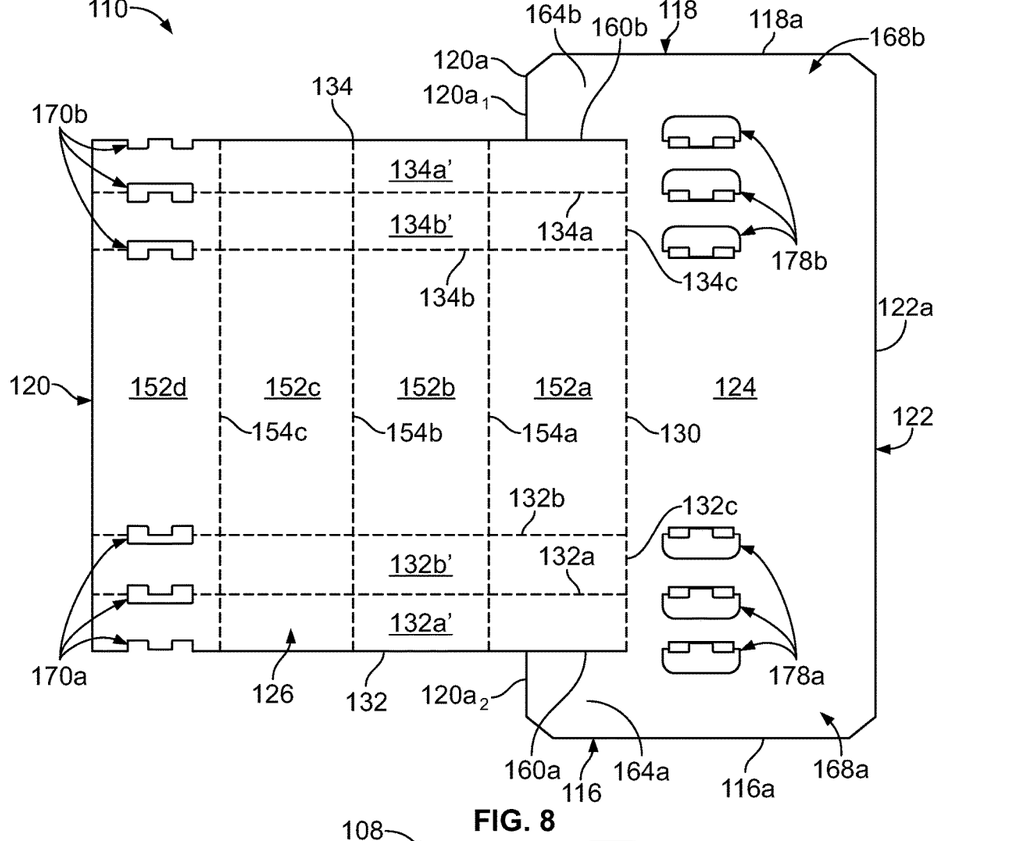
FIG. 8 is a plan view of a blank for constructing an optional pallet stabilizer.
Figure 9:
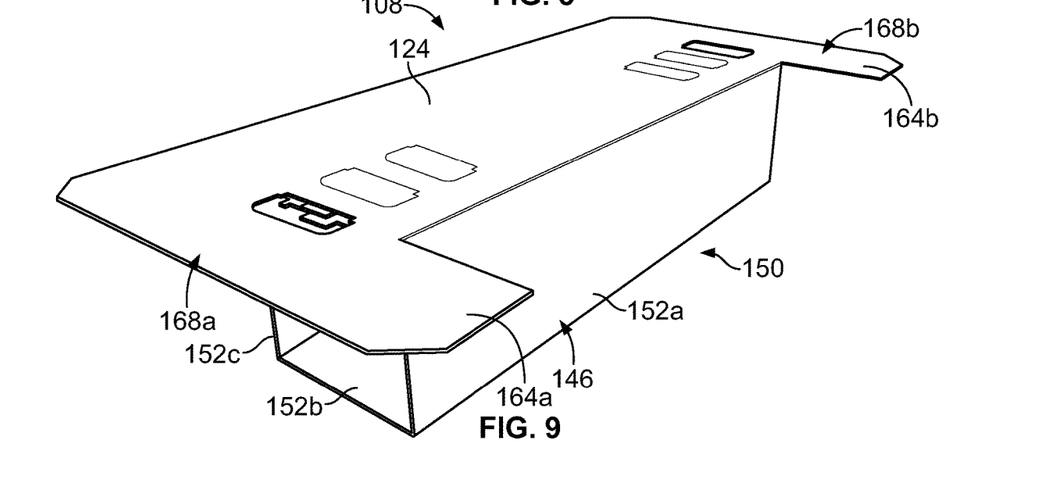
FIG. 9 is a perspective view of a pallet stabilizer formed using the blank of FIG. 8.

Referring to FIGS. 8 and 9, an optional configuration for a pallet stabilizer 108 and associated blank 110 is illustrated. Generally, the optional pallet stabilizer 108 is half of the pallet stabilizer 8 described above, wherein elements of the present pallet stabilizer 108 and blank 110 corresponding to the pallet stabilizer 8 and blank 10 described above are labeled with the same reference numerals increased by 100.

The blank 110 for forming the pallet stabilizer 108 comprises a planar piece of material including first and second longitudinal edges, generally designated 116 and 118, respectively, and including first and second lateral edges, generally designated 120 and 122, respectively. The blank 110 further comprises a generally planar central panel 124 including a first outer longitudinal side 116a coinciding with the first longitudinal edge 116 of the blank 110, an opposing second outer longitudinal side 118a coinciding with the second longitudinal edge 118 of the blank 110, and opposing first and second lateral sides 120a, 122a. The second lateral side 122a coincides with the second lateral edge 122 and generally extends as continuous edge or side from the first outer longitudinal side 116a to the second outer longitudinal side 118a.

The blank 110 further comprises a body flap 126. The body flap 126 is hingedly joined to the central panel 124 along a lateral flap fold line 130 extending generally transverse to the first and second outer longitudinal sides 116a, 118a. The body flap 126 includes first and second inner longitudinal edges 132, 134 spaced inward from the respective first and second outer longitudinal sides 116a, 118a, wherein the first and second inner longitudinal edges 132, 134 extend laterally outward from the central panel 124 between the first flap fold line 130 and an outer edge of the first body flap 126 defined at the first lateral edge 120. Further, the first and second inner longitudinal edges 132, 134 extend laterally outward from a pair of lateral side portions 120a₁, 120a₂ defining the first lateral side 120a of the central panel 124 on opposing longitudinal sides of the body flap 126.

The body flap 126 comprises a first flap panel 152a, a second flap panel 152b, a third flap panel 152c, and a fourth flap panel 152d connected in series at a first panel fold line 154a, a second panel fold line 154b, and a third panel fold line 154c, respectively. The first, second, and third panel fold lines 154a, 154b, 154c may comprise crease rule fold lines.

The flap fold line 130 is defined at a connection between the flap panel 152a and the central panel 124, wherein the flap fold line 130 is located laterally spaced inward from the lateral side portions 120a₁, 120a₂. At least a portion of the flap fold line 130 can comprise a crease rule fold line. A pair of separation lines 160a, 160b extend laterally along the inner longitudinal edges 132, 134 from the first flap fold line 130 to the lateral side portions $120a_1$, $120a_2$, separating the body flap 126 from the central panel 124 and permitting pivotal movement of the body flap 126 within the central panel 124.

The body flap 126 includes a pair of longitudinally spaced first locking structures 170a, 170b, and the central panel 124 includes a pair of longitudinally spaced second locking structures 178a, 178b located for engagement with respective ones of the first locking structures 170a, 170b. Further, plural pairs of first locking structures 170a, 170b and corresponding second locking structures 178a, 178b can be provided as described above to accommodate different longitudinal dimensions of the body flap 126 to form different lengths of a beam body 146 for the erected pallet stabilizer 108.

A first support member 168a is defined extending longitudinally outward from a first longitudinal end of the beam body 146, corresponding to the inner longitudinal edge 132 of the body flap 126. A second support member 168b is defined extending longitudinally outward from a second longitudinal end of the beam body 146, corresponding to the inner longitudinal edge 134 of the body flap 126.

The body flap 126 can include one or more length score lines 132a, 132b and 134a, 134b extending parallel to the respective longitudinal edges 132, 134 and defining respective length sections 132a', 132b' and 134a', 134b'. The edges of the body flap 126 can folded, or alternatively torn off, at the length score lines 132a, 132b and 134a, 134b to shorten the beam length defined by the body flap 126. The longitudinal dimension of the body flap 126 can be selectively reduced by folding or tearing off the length sections 132a', 132b' and 134a', 134b' as described above for the blank 10. The portions 132c, 134c of the lateral flap fold line 130 adjacent to the ends of the length sections 132a', 132b', 134a', 134b' can be formed with perforations or through cuts sufficient to facilitate separation of the length sections 132a', 132b', 134a', 134b' from the central panel 124, whereas the remainder of the flap fold line 130 may be formed as a crease rule fold line, i.e., a non-separating fold line.

The body flap 126 can be folded as described above for the body flap 26 of the blank 10 to the form the beam body 146 of a hollow beam structure 150, see FIG. 9. Further, the first and second locking structures 170a, 170b and 178a, 178b can cooperate with each other as described for the first and second locking structures 70a, 70b and 78a, 78b to retain the fourth flap panel 152d in place on the central panel 124 following folding of the body flap 126 to form the beam body 146. It may be noted that the erected pallet stabilizer 108 includes lateral extensions 164a, 164b to one side of the beam body 146 and includes a laterally extending portion of the central panel 124 spaced outward from the other side of the beam body 146, as defined along the continuous lateral side 122a of the central panel 124.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pallet stabilizer formed from a paperboard blank comprising:
   a generally planar central panel having opposing first and second outer longitudinal sides, and opposing first and second lateral sides;
   a hollow beam structure including at least one beam body defined by a body flap formed integral with the central panel and comprising:
      a plurality of flap panels connected in series at respective panel fold lines;
      two of the flap panels defining longitudinally extending opposing beam sides extending transverse to a plane defined by the central panel;
      one of the flap panels being located distal from the central panel and hingedly connected to each of the two flap panels defining the beam sides at respective panel fold lines; and
      opposing longitudinal beam edges spaced longitudinally inward from the opposing outer longitudinal sides of the central panel.

2. The pallet stabilizer as set forth in claim 1, wherein the opposing beam sides are each spaced laterally inward from a respective one of the first and second lateral sides of the central panel.

3. The pallet stabilizer as set forth in claim 1, wherein the plurality of flap panels forming the at least one beam body comprise first, second, third, and fourth flap panels connected in series at first, second, and third panel fold lines, respectively, and the first flap panel is hingedly joined to the central panel along a lateral flap fold line generally transverse to the first and second outer longitudinal sides, and the fourth flap panel defines an outer edge of the body flap.

4. The pallet stabilizer as set forth in claim 3, wherein the fourth flap panel is positioned in parallel overlapping relation on the central panel with the outer edge located adjacent to the first flap panel at the lateral flap fold line.

5. The pallet stabilizer as set forth in claim 1, wherein the at least one beam body includes a first locking structure for cooperating with a second locking structure on the central panel to hold the at least one beam body in engagement with the central panel.

6. The paperboard blank as set forth in claim 5, wherein one of the first and second locking structures comprises a body tab structure located at a longitudinal edge of the at least one beam body and the other of the first and second locking structures comprises a tongue structure hingedly connected in the central panel and including a lock tab structure for positioning in overlapping engagement over the body tab structure to maintain the tongue structure in overlapping relation over the edge of the at least one beam body.

7. The paperboard blank as set forth in claim 1, wherein the body flap includes a pair of longitudinally spaced first locking structures located at the first and second longitudinal edges of the at least one beam body, and the central panel includes a pair of longitudinally spaced second locking structures located for engagement with respective ones of the first locking structures.

8. The pallet stabilizer as set forth in claim 1, including one or more longitudinal score lines extending laterally across the flap panels and defining a fold or tear location configured for decreasing a longitudinal dimension of the at least one beam body, wherein a first locking structure is defined longitudinally aligned with each longitudinal score line for cooperating with a corresponding longitudinally aligned second locking structure on the central panel to hold the at least one beam body in engagement with the central panel.

9. The pallet stabilizer as set forth in claim 1, wherein the body flap comprises a first body flap forming a first beam body, the hollow beam structure further including a second body flap formed integral with the central panel and forming a second beam body laterally spaced from the first beam body and comprising:
  a plurality of second beam flap panels connected in series at respective panel fold lines;
  two of the plurality of second beam flap panels defining longitudinally extending opposing second beam sides extending transverse to a plane defined by the central panel;
  one of the second beam flap panels being located distal from the central panel and hingedly connected to each of the two second beam flap panels defining the second beam sides at respective panel fold lines.

10. A pallet stabilizer formed from a paperboard blank comprising:
  a generally planar central panel having opposing first and second outer longitudinal sides, and opposing first and second lateral sides;
  a hollow beam structure including first and second beam bodies defined by respective first and second body flaps formed integral with the central panel, each of the beam bodies comprising:
    a plurality of flap panels connected in series at respective panel fold lines;
    two of the flap panels defining longitudinally extending opposing beam sides extending transverse to a plane defined by the central panel;
    one of the flap panels being located distal from the central panel and hingedly connected to each of the two flap panels defining the beam sides at respective panel fold lines; and
    opposing longitudinal beam edges spaced longitudinally inward from the opposing outer longitudinal sides of the central panel.

11. The pallet stabilizer as set forth in claim 10, wherein the first and second beam bodies are spaced laterally inward from a respective one of the first and second lateral sides of the central panel.

12. The pallet stabilizer as set forth in claim 10, wherein the plurality of flap panels forming each respective beam body comprise first, second, third, and fourth flap panels connected in series at first, second, and third panel fold lines, respectively, and the first flap panel is hingedly joined to the central panel along a lateral flap fold line generally transverse to the first and second outer longitudinal sides.

13. The pallet stabilizer as set forth in claim 12, wherein the fourth flap panel of each beam body is positioned in parallel overlapping relation on the central panel.

14. A paperboard blank for use in forming a pallet stabilizer comprising:
  a central panel having opposing first and second outer longitudinal sides, and opposing first and second lateral sides;
  at least one body flap hingedly joined to the central panel along a lateral flap fold line generally transverse to the first and second outer longitudinal sides, the at least one body flap having first and second inner longitudinal edges spaced inward from the first and second outer longitudinal sides and extending laterally outward from the central panel;
  an outer edge at a laterally opposing end of the at least one body flap from the flap fold line, and first, second, third, and fourth flap panels connected in series at first, second, and third panel fold lines, respectively; and
  the flap panels being foldable relative to the each other and relative to the central panel to position the fourth flap panel in parallel overlapping relation on the central panel when the paperboard blank is formed into a pallet stabilizer.

15. The paperboard blank as set forth in claim 14, wherein the fourth flap panel includes a first locking structure for cooperating with a second locking structure on the central panel to hold the fourth flap panel in engagement with the central panel when the paperboard blank is formed into a pallet stabilizer.

16. The paperboard blank as set forth in claim 15, wherein one of the first and second locking structures comprises a body tab structure located at a longitudinal edge of the at least one body flap and the other of the first and second locking structures comprises a tongue structure hingedly connected in the central panel and including a lock tab structure for positioning in overlapping engagement over the body tab structure when the paperboard blank is formed into a pallet stabilizer.

17. The paperboard blank as set forth in claim 15, wherein the fourth flap panel includes a pair of longitudinally spaced first locking structures located at the first and second inner longitudinal edges, and the central panel includes a pair of longitudinally spaced second locking structures located for engagement with respective ones of the first locking structures.

18. The paperboard blank as set forth in claim 14, wherein the flap fold line is located laterally inward on the central panel between the first and second lateral sides of the central panel.

19. The paperboard blank as set forth in claim 14, including one or more longitudinal score lines extending laterally across the at least one body flap from the flap fold line to the outer edge and defining a fold or tear location configured for decreasing a longitudinal dimension of the flap.

20. The paperboard blank as set forth in claim 14, wherein the at least one body flap comprises a first body flap, and including a second body flap hingedly joined to the central panel along a lateral second flap fold line generally transverse to the first and second outer longitudinal sides, the second body flap including:
  first and second inner longitudinal edges spaced inward from the first and second outer longitudinal sides and extending laterally outward from the central panel opposite from the first body flap; and
  an outer edge at a laterally opposing end of the second body flap from the second flap fold line, and first, second, third, and fourth flap panels connected in series at first, second, and third panel fold lines, respectively.

* * * * *